United States Patent
Seits

(10) Patent No.: US 8,820,806 B1
(45) Date of Patent: Sep. 2, 2014

(54) COMPACT COLLAPSIBLE SHOVEL

(71) Applicant: George Seits, Tampa, FL (US)

(72) Inventor: George Seits, Tampa, FL (US)

(*) Notice: Subject to any disclaimer, the term of this patent is extended or adjusted under 35 U.S.C. 154(b) by 0 days.

(21) Appl. No.: 14/176,099

(22) Filed: Feb. 9, 2014

Related U.S. Application Data

(60) Provisional application No. 61/762,906, filed on Feb. 10, 2013.

(51) Int. Cl.
*A01B 1/02* (2006.01)

(52) U.S. Cl.
CPC .................................. *A01B 1/022* (2013.01)
USPC .................................. 294/51; 294/49; 294/57

(58) Field of Classification Search
CPC ............. A01B 1/02; A01B 1/022; A01B 1/00
USPC .............. 294/49, 51, 53.5, 54.5, 176, 57, 1.3, 294/1.4, 1.5
See application file for complete search history.

(56) References Cited

U.S. PATENT DOCUMENTS

| | | | |
|---|---|---|---|
| 140,855 A * | 7/1873 | Stone | 294/51 |
| 291,732 A * | 1/1884 | Holland | 294/51 |
| 860,746 A * | 7/1907 | Hoffman | 294/176 |
| 1,372,722 A | 3/1921 | Paradis | |
| 1,407,237 A | 2/1922 | Thompson | |
| 1,475,899 A * | 11/1923 | Thibault | 294/49 |
| 3,037,219 A | 6/1962 | Webb | |
| 3,431,661 A * | 3/1969 | Carlson | 37/273 |
| 3,583,746 A | 6/1971 | Lissakers | |
| 4,475,757 A * | 10/1984 | Glock | 294/51 |
| 4,958,871 A | 9/1990 | Hemans | |
| 5,205,122 A * | 4/1993 | Wong | 56/400.04 |
| 5,676,412 A | 10/1997 | Kahley | |
| 5,743,580 A | 4/1998 | Evans | |
| 6,471,267 B2 * | 10/2002 | Asazuma | 294/1.5 |
| 7,549,451 B2 | 6/2009 | Sanchelli | |
| 2003/0184104 A1 | 10/2003 | Ping | |
| 2007/0028487 A1 | 2/2007 | Larson | |
| 2007/0046045 A1 * | 3/2007 | Yilmaz | 294/1.4 |

* cited by examiner

*Primary Examiner* — Saul Rodriguez
*Assistant Examiner* — Gabriela Puig
(74) *Attorney, Agent, or Firm* — Maxey Law Offices, PLLC; Stephen Lewellyn

(57) ABSTRACT

A portable, collapsible shovel that can be carried within a backpack without becoming caught on the backpack or other items stored in the backpack is provided. The shovel has hollow tubular handle, a spade frame assembly, a t-handle, and a fabric spade sheath that can be assembled to form a shovel suitable for digging. When not being used, the spade frame, the t-handle, and the fabric spade sheath are completely stored within the hollow tubular handle for easy carrying and storage.

4 Claims, 2 Drawing Sheets

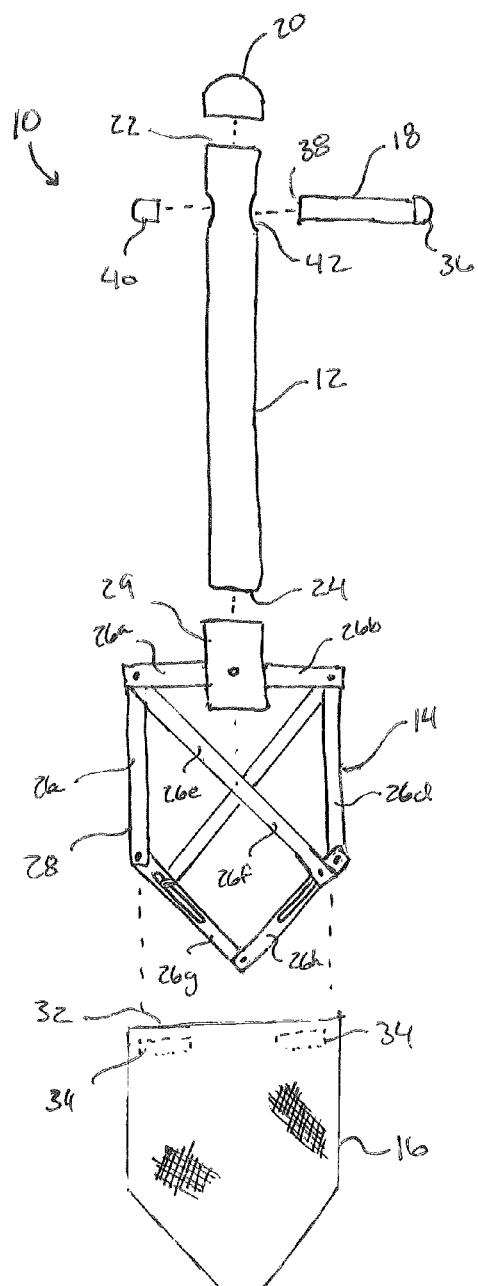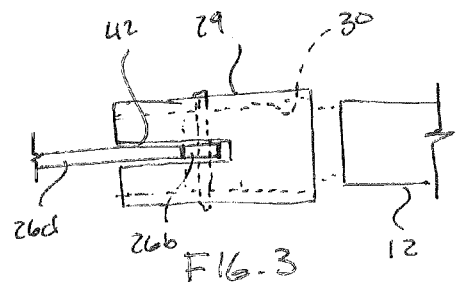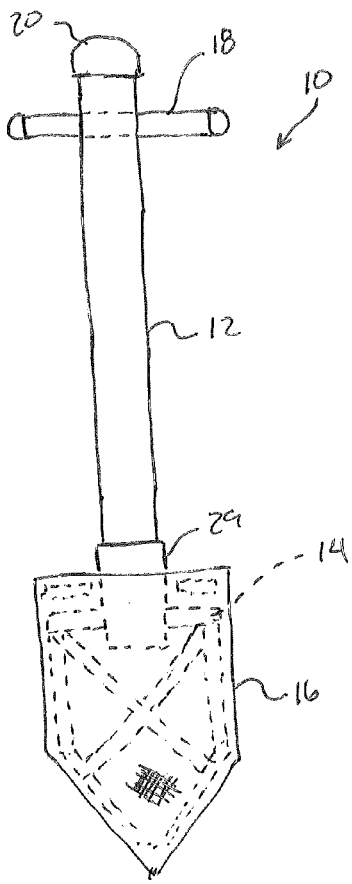

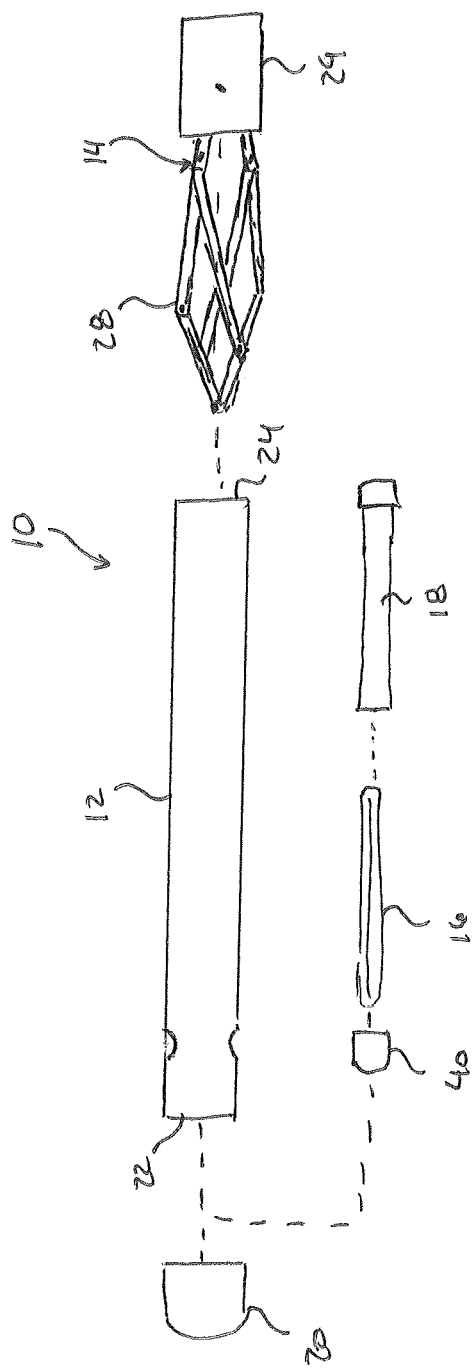
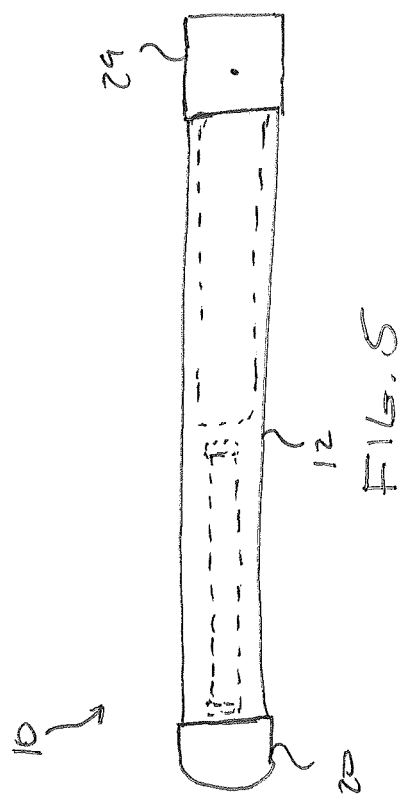

COMPACT COLLAPSIBLE SHOVEL

CROSS-REFERENCE TO RELATED APPLICATIONS

This application claims the benefit of provisional patent application Ser. No. 61/762,906, filed Feb. 10, 2013, the entirety of which is incorporated herein by reference.

FIELD OF THE INVENTION

The present invention relates generally to shovels, and more particularly, relating to collapsible shovels that can be disassembled for storage and transport and which disassembled components are stored entirely within the shovel handle.

BACKGROUND OF THE INVENTION

Collapsible shovel devices are known in the prior art. U.S. Pat. No. 4,475,757 describes a shovel having a spade blade pivotally connected to a handle such that the spade blade is pivotal and lockable in various positions. U.S. Pat. No. 1,475,899 describes a shovel having a spade blade of two half portions that are lockable together with the handle. U.S. Pat. No. 5,676,412 describes a snow shovel having a blade that is hinged to allowing folding in half. Similarly, U.S. Pat. No. 1,372,722 describes a shovel having a hinged blade to permit folding of the blade. U.S. Pat. No. 1,407,237 describes a shovel having a handle that is hinged to allow the handle to fold in half and blade pivotally attached to the handle to also permit the blade to fold against the handle.

While these devices fulfill their respective, particular objectives and requirements, the need remains for a collapsible shovel that is more easily transported within a gear bag or backpack.

SUMMARY OF THE INVENTION

Embodiments of the present invention addresses this need by providing a new collapsible shovel design that includes a detachable spade and handgrip that are entirely within the hollow interior of the shovel handle for storage.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 1 is a diagrammatic exploded view of a compact collapsible shovel constructed in accordance with the principles of an embodiment of the present invention;

FIG. 2 is a diagrammatic view of the compact collapsible shovel assembled in an in-use configuration;

FIG. 3 is an enlarged diagrammatic view of a coupling member of a frame assembly that removably connects the frame assembly to the shovel handle;

FIG. 4 is a diagrammatic exploded view of the compact shovel in a collapsed configuration; and FIG. 5 is a diagrammatic view of the compact collapsible shovel assembled in the collapsed and stored configuration.

DETAILED DESCRIPTION OF THE INVENTION

With reference to FIGS. 1 through 5, there is representatively illustrated a new collapsible shovel 10 in accordance with an embodiment of the present invention. Shovel 10 generally comprises a handle 12, a spade blade frame assembly 14, a fabric spade sheath 16 and a handgrip or T-handle member 18.

Handle 12 is a rigid hollow tube with opposed open ends 22 and 24 through which the interior of the handle is accessed for storing the frame assembly 14, fabric spade sheath 16, and T-handle member 18 within the interior of the handle as will be discussed further below.

Spade blade frame assembly 14 includes plurality of thin elongated frame members 26a-26h that are pivotally interconnected to form a frame 28 that is expandable from a collapsed configuration. As best seen in FIG. 1, with the frame 28 in the extended position, frame members 26a-26h are positioned to generally form a spade shape. And, as best seen in FIG. 4, with the frame 28 in the collapsed position, frame members 26a-26h are collapsed together into a narrow form that may be received by the interior of handle 12. Frame assembly 14 further includes a coupling 29 to which frame members 26a and 26b are pivotally attached. Frame members 26a and 26b extend through opposed lateral slots 42 which permit the frame members to pivot relative to coupling 29. Coupling 29 further includes a socket 30 which is configured to receive end 24 of the handle 12 to removably connect the frame assembly 14 to the handle in either a stored configuration wherein the frame is disposed within the handle or in an in-use configuration wherein the frame extends outwardly from the handle.

Fabric spade sheath 16 is shaped to generally conform to the shape of the extended frame 28 and is seamed or otherwise connected along its periphery to form a pocket having open end 32 through which frame 28 is inserted into the pocket. The frame 28 supports the sheath 16 and together they form a spade blade suitable for digging. Sheath 16 is formed of a durable textile material to withstand tearing when the shovel 10 is used. Sheath 16 may include fasteners, such as Velcro fasteners 34 to close open end 32 once the sheath is slid over frame 28. Of course other fasteners such as snaps, buttons, zipper, ties, drawstrings, and the like may be substituted for Velcro fasteners 34.

T-handle 18 is a rigid hollow tube with closed end 36 and opposed open end 38 through which the interior of the T-handle is accessed. A cap 40 is configured to attach and seal closed end 38. T-handle 18 is attached, perpendicular, to handle 12 by passing the T-handle through opening 42 that extends transversely through the handle at position approximate to end 22. Cap 40 is attached to end 38 preventing withdrawal of the T-handle from opening 42.

As best seen in FIGS. 1 and 2, in the in use configuration frame 28 is expanded into the spade shape, sheath 16 is positioned over the frame with the frame disposed within the sheath pocket, and the frame assembly is attached to end 24 of the handle 12 by receiving end 24 into the socket 30 of coupling 29 such that the frame extends from the handle. T-handle 18 is disposed within opening 24 and secured therein by cap 40 attached to end 38. Cap 20 is attached to and seals open end 22 of handle 12. Of course, the order of operation of assembly may be concluded in a different order.

As best seen in FIGS. 4 and 5, in the stored configuration frame 28 is collapsed and disposed within handle 12 by inserting the frame through open end 24. The frame is retained within handle 12 by receiving end 24 into the socket of coupling 29 in a reversed direction. Sheath 16 is tightly wound into a roll and disposed within the interior of T-handle 18 by inserting the sheath through open end 38 of the T-handle. The sheath 16 is retained within the T-handle 18 by cap 40 attached to and sealing end 38. The T-handle 18 is disposed within handle 12 by inserting the T-handle through open end 22 and is retained within the handle 12 by cap 20 secured to and sealing end 22. In this configuration, shovel 10 is provided in a tubular form with the frame assembly 14, sheath 16, and T-handle 18 securely retained entirely within the handle 12.

The tubular configuration allows for more compact storage of the shovel 10 as compared to prior collapsible shovels. The tubular configuration is advantageous over prior collapsible shovels because it can be easily inserted and retrieved from a gear bag or backpack without the shovel becoming caught on the bag or other items stored in the bag.

A number of embodiments of the present invention have been described. Nevertheless, it will be understood that various modifications may be made without departing from the spirit and scope of the invention.

What is claimed is:

1. A collapsible shovel comprising:
  a hollow tubular handle having opposed first and second ends each of which being open and through which the interior of said hollow tubular handle is accessible, said hollow tubular handle further including an transverse opening approximate said first end;
  a first cap member removably attachable to said first end of said hollow tubular handle to seal said first end;
  a hollow tubular T-handle having opposed first and second ends, said first end being open and through which the interior of said hollow tubular T-handle is accessible, and said second end being closed;
  a second cap member removably attachable to said first end of said hollow tubular T-handle to seal said first end;
  a spade blade frame assembly including a plurality of elongated frame members and a coupling, said elongated frame members being pivotally connected such that said frame members form a frame that has an extended configuration wherein said frame members are positioned to form a spade shape and a collapsed configuration wherein said frame members are positioned in a narrow form such that said frame members are positionable within said hollow tubular handle through said second end; and said coupling attached to said frame; and
  a fabric spade sheath having a sealable open end and being shaped to generally conform to the shape of said frame, and wherein said frame is removably receivable by said fabric spade sheath when is said extended position and serves to support said fabric spade sheath.

2. The collapsible shovel of claim 1, wherein said coupling detachably connects said frame to said second end of said hollow tubular handle.

3. The collapsible shovel of claim 1, wherein said fabric spade sheath is positionable within said hollow tubular T-handle.

4. The collapsible shovel of claim 1, wherein said collapsible shovel has an assembled configuration and a stored configuration;
  wherein when said collapsible shovel is in said assembled configuration said frame is extended and attached to said second end of said hollow tubular handle by said coupling, said fabric spade sheath is secured over said frame, and said hollow tubular T-handle extends through said transverse opening of said hollow tubular handle; and
  wherein said collapsible shovel is in said stored configuration said frame is collapsed and positioned in said hollow tubular handle through said second end, said coupling is attached to said second end of said hollow tubular handle, said fabric spade is sheath rolled up and positioned within said hollow tubular T-handle, said hollow tubular T-handle is positioned within said hollow tubular handle, and said first cap is attached to said first end of said hollow tubular handle.

* * * * *